(12) United States Patent
Su et al.

(10) Patent No.: US 10,172,283 B1
(45) Date of Patent: Jan. 8, 2019

(54) GRASS-DISCHARGING-PASSAGE STIRRING AND CUTTING MECHANISM FOR REAR SHAFT AT BOTTOM OF LAWN MOWER

(71) Applicant: NINGBO DAYE GARDEN MACHINERY CO., LTD, Yuyao, Zhejiang (CN)

(72) Inventors: Ke Su, Zhejiang (CN); Xiaobo Ye, Zhejiang (CN)

(73) Assignee: NINGBO DAYE GARDEN MACHINERY CO., LTD, Yuyao (CN)

( * ) Notice: Subject to any disclaimer, the term of this patent is extended or adjusted under 35 U.S.C. 154(b) by 0 days.

(21) Appl. No.: 15/951,888

(22) Filed: Apr. 12, 2018

(30) Foreign Application Priority Data

Feb. 6, 2018 (CN) .......................... 2018 1 0148474

(51) Int. Cl.
  *A01D 34/82* (2006.01)
  *A01D 34/49* (2006.01)
  *A01D 34/47* (2006.01)

(52) U.S. Cl.
  CPC ......... *A01D 34/826* (2013.01); *A01D 34/475* (2013.01); *A01D 34/49* (2013.01)

(58) Field of Classification Search
  CPC .... A01D 34/826; A01D 34/475; A01D 34/49; A01D 34/71; A01D 43/06; A01D 43/02; A01D 43/08; A01D 43/086
  See application file for complete search history.

(56) References Cited

U.S. PATENT DOCUMENTS 3,596,450 A * 8/1971 Bowers .................. A01D 43/02
  172/21
4,186,239 A * 1/1980 Mize .................. A01D 34/4168
  30/276

(Continued)

FOREIGN PATENT DOCUMENTS

| DE | 10352560 A1 * | 6/2005 | ........... A01D 34/826 |
| EP | 0422624 A1 * | 4/1991 | ........... A01D 34/005 |
| EP | 2692223 A1 * | 2/2014 | ............. A01D 34/71 |

*Primary Examiner* — Thomas B Will
*Assistant Examiner* — Joan D Misa
(74) *Attorney, Agent, or Firm* — Wayne & Ken, LLC; Tony Hom

(57) ABSTRACT

An improved grass-discharging-passage stirring and cutting mechanism for a rear shaft at a bottom of a lawn mower. Ultra-thin blades are adopted since a grass-discharging passage is very narrow and small while many stirring and cutting rods and blades are used. The blade is firstly placed into mixed buried soil, is subjected to thermal treatment, is scanned by variable-frequency electromagnetic field and laser, and is subjected to electromagnetic co-penetration heat treatment under platinum-rhodium catalysis; then the blade is subjected to organic post-treatment, is heated at a co-penetration turning point of 723° C., and then quenched in organic matter of horse urine; a noise-elimination inner shaft of the rear shaft of the lawn mower is hollow and has a plurality of noise-elimination wedges for facilitating noise elimination and reduction. The improved mechanism may be powered directly by a three-stage planetary retarder connected to an electric motor.

3 Claims, 11 Drawing Sheets

(56) References Cited

U.S. PATENT DOCUMENTS

| | | | | |
|---|---|---|---|---|
| 5,269,127 | A * | 12/1993 | Miles, Jr. | A01D 34/005 56/193 |
| 5,375,399 | A * | 12/1994 | Kraft | A01D 34/005 15/347 |
| 6,705,068 | B2 * | 3/2004 | Iida | A01D 34/826 56/202 |
| 7,210,231 | B2 * | 5/2007 | Legrand | A01D 34/4168 30/276 |
| 7,392,643 | B2 * | 7/2008 | Warashina | A01D 34/005 56/17.5 |
| 8,667,771 | B2 * | 3/2014 | Williams | A01D 34/822 56/12.4 |
| 10,039,229 | B2 * | 8/2018 | Wadzinski | A01D 34/005 |
| 2003/0182919 | A1 * | 10/2003 | Baumann | A01D 34/71 56/320.1 |
| 2016/0353659 | A1 * | 12/2016 | Schaedler | A01D 42/06 |
| 2017/0245432 | A1 * | 8/2017 | Yoshimura | A01D 34/64 |

* cited by examiner

GRASS-DISCHARGING-PASSAGE STIRRING AND CUTTING MECHANISM FOR REAR SHAFT AT BOTTOM OF LAWN MOWER

TECHNICAL FIELD

The present invention relates to a lawn mower used for trimming a lawn in places such as courtyards, parks and locations near roads, and more specifically, to a grass-discharging-passage stirring and cutting mechanism at a bottom of a lawn mower.

BACKGROUND

Operators prefer different modes of operation when using lawn mowers. Some operators are accustomed to increasing the operating force on the upper handrail of the second half and leaning the body to the top, which increases the possibility of tilting the front wheels. The design of the lawn mower should also take the comfort and convenience of a user into consideration as much as possible. The lawn mower using a gasoline engine has less front cocking due to the heavy weight of the engine. However, there is also the undesirable phenomenon of front cocking, especially the front cocking of the left front wheel. For a power-driven lawn mower, the electric motor is lighter in weight than the engine, while the center shaft of the electric motor needs to drive a hay knife having a large swing diameter, but cannot be installed too near the front, so the phenomenon of front-wheel cocking and lifting of the power-driven lawn mower is more common. In accordance with relevant standards such as GB4706.78-2005; IEC60335-2-77-2002; EN836-1997, especially EN836/A3-2004/4.2.3.2.1-4.2.3.2.3.3, there are standardized requirements of a slope of 16.7 degrees. If a counterweight sand pot is added in the front portion of the entire machine of the lawn mower, it will need to modify the chassis, add a three-hole site and add sandstones, which is troublesome. Since the counterweight is heavy, the transportation cost is also high.

Instead of using a knife, another common lawn mower uses a grass-cutting head which has a nylon wire driven by a series-excited motor. When the lawn mower is installed and actuated to enable the nylon wire inside a spinning reel to rotate, grass can be cut. When the wire is too short, the operator presses down the lawn mower once, and thus the aluminum head of the spinning reel touches the ground to enable the spring of the spinning reel to be compressed, such that the spinning reel is rotated so that the nylon wire inside passes through a wire eyelet insert to pay off the wire. The payed-off wire which is overlong is trimmed with a blade. A blade sheath is sleeved onto the blade for protection when the blade is not used. The grass-cutting head has a great grass-cutting effect, is lighter in weight and more power-saving than the knife, but since the grass-cutting head needs to be pressed downwards to pay off the wire, the grass-cutting head cannot be installed in a normal lawn mower with wheels.

How to save one wheel of a common four-wheel mower and to make turning and reversing more flexible needs to be solved. And the cut grass is crowded at the row of grass, and the winding is blocked. How to smooth the row of grass remains to be solved.

Combining anechoic and metal post-processing to improve noise reduction and noise reduction and wear resistance of parts, inventing a lawn mower bottom dial cutting and cutting mechanism with muffler and metal post-treatment, suitable for a variety of models of lawn mowing Grass machines and electric intelligent lawn mowers is an urgent need for the market.

SUMMARY

The present invention relates to a lawn mower used for trimming a lawn in places such as courtyards, parks and locations near roads, which is a dual-purpose grass-discharging-passage stirring and cutting mechanism at a bottom of a lawn mower, having the advantages of noise elimination and reduction and abrasion resistance of parts and capable of being both driven by a gear driven by an engine and directly driven by an electric motor, which is developed on the basis of an improved lower-stirring and upper-cutting mechanism for cleaning the grass blocked at the grass-discharging passage of a handmower and an improved automatic grass-discharging-passage cleaning mechanism for the rear shaft at the bottom of the lawn mower in combination with noise elimination and metal post-treatment. The mechanism is a dual-purpose grass-discharging-passage stirring and cutting mechanism at the bottom of the lawn mower, which has been subjected to noise elimination and metal post-treatment, and is referred to as an improved grass-discharging passage stirring and cutting mechanism for the rear shaft at the bottom of the lawn mower.

The grass-discharging-passage stirring and cutting mechanism for the rear shaft at the bottom of a lawn mower is a dual-purpose grass-discharging-passage stirring and cutting mechanism provided at the bottom of a lawn mower after noise elimination and metal post-treatment. The lawn mower includes a gear of a retarder geared with the lawn mower and a stirring and cutting rod arranged on the noise-elimination inner shaft of the rear shaft of the lawn mower, characterized in that the noise-elimination inner shaft is hollow and has a plurality of noise-elimination wedges; the rear shaft of the lawn mower has a shape of a hollow tube and the inner side thereof is hollow to enable external air to pass through for cooling. The rear shaft of the lawn mower is divided into a left shaft and a right shaft, and the noise-elimination inner shaft is arranged between the left shaft and the right shaft of the rear shaft of the lawn mower. The noise-elimination inner shaft is divided into three sections. The middle section of the noise-elimination inner shaft has a same diameter as a diameter of the rear shaft of the lawn mower, and the left section and the right section of the noise-elimination inner shaft are hollow tubes which have internal diameters respectively smaller than those of the left shaft and the right shaft of the rear shaft of the lawn mower. The left section of the noise-elimination inner shaft is inserted into the left shaft of the rear shaft of the lawn mower, and the right section of the noise-elimination inner shaft is inserted into the right shaft of the rear shaft of the lawn mower. A plurality of hexagonal-pyramid-shaped noise-elimination wedges are arranged on the noise-elimination inner shaft. The hexagonal pyramid shape has a small hole in the top thereof to act as a noise-elimination hole. The plurality of hexagonal-pyramid-shaped noise-elimination wedges arranged on the hollow tube of the inner shaft located at an end of the noise-elimination inner shaft near the position matched with the rear shaft of the lawn mower are dense, while the plurality of hexagonal-pyramid-shaped noise-elimination wedges arranged on the hollow tube of the inner shaft located at an end of the noise-elimination inner shaft away from the position matched with the rear shaft of the lawn mower are sparse. The outer middle portion of the noise-elimination inner shaft is provided with an isolated connection portion which acts as a portion matched with the rear shaft of the lawn mower, such that one end of the portion is connected to one end of the rear shaft at the right side of the rear shaft near the grass outlet and the other end of the portion is connected to one end of the rear shaft away from the grass outlet, and thus the gas flow from the stirring and cutting site near the grass outlet with reference to a Lighthill parameter and a turbulence noise of Richards noise is compressed at a port of an end near the right rear wheel and near the grass outlet, and then re-expanded into the hollow rear shaft. The re-expanded gas flow is compressed again by the plurality of dense hexagonal-pyramid-shaped noise-elimination wedges arranged on the hollow tube of the noise-elimination inner shaft at the end of the noise-elimination inner shaft near the grass outlet in the hollow rear shaft. After running in the noise-elimination inner shaft for a while, the gas flow is compressed again by the plurality of sparse hexagonal-pyramid-shaped noise-elimination wedges arranged on the hollow tube of the noise-elimination inner shaft at the end of the noise-elimination inner shaft away from the grass outlet, and then overflows again into an inner through hole at the other end of the noise-elimination inner shaft included in the rear shaft to flow to the outside, such that the noise elimination and reduction process is conducted by compressing, expanding, compressing again and expanding again; and this also facilitates cooling via the external air. A plurality of stirring and cutting rods are sleeved on the rear shaft. The stirring and cutting rods are blades. Each of the stirring and cutting rods has three blades with diameters of the three blades angled at 120 degrees in radial direction with each other. The blades are sleeved on the rear shaft, but each of the three blades of adjacent axially of the rear shaft should intersect with each other at an angle of 30 degrees; the slip cutting angle is 20 degrees, and the protruding direction of each blade along the radial direction and the hypsokinesis of the radial line make the included angle of the blade be 13.5 degrees. The gear of the retarder, the noise-elimination inner shaft and the stirring and cutting rod are metallic workpieces which are subjected to post-treatment via high-frequency current by using a skin effect. When the blade makes a collision with obstacles such as stones, breakage of the blade and damage to the gear and engine power may be easily caused. An ultra-thin blade and a noise-elimination inner shaft which are made of special material and subjected to carbonitroboronizing and organic post-treatment are adopted. The metallic workpieces are buried in rare earth and treated via high-frequency current by using the skin effect. The workpieces may be made of titanium aluminum and rhenium, and are placed in molded ceramic containing yttrium oxide, rare earth, indium and clay, and are subjected to isotope radiation and laser scan. The blade is subjected to three-dimensional printed by using carbon fibers, then sharpened using diamond, is subjected to thermal treatment in mixed buried soil consisting of nanoscale printing toner, urea and borax, is scanned by variable-frequency electromagnetic field and laser, and is subjected to electromagnetic co-penetration heat treatment under the platinum-rhodium catalysis, so that the spatial crystal lattices of the blade are dispersed; then the blade is subjected to organic post-treatment, is heated at a co-penetration turning point of 723° C., then quenched in horse urine, washed with clear water and then coated with varnish. The blade not only can meet the needs of practical stirring and cutting of grass, but also has an overload protection function. Therefore, the mechanism is provided with a pressure-protection sensor. When overload occurs, the sensor sends a signal and enables an overload contact of an electromagnet to exert an attraction force so that slip occurs between the blade holder and blade so as to realize automatic avoidance of rotation. The improved grass-discharging-passage stirring and cutting mechanism for the rear shaft at the bottom of the lawn mower can be powered directly by a retarder connected to an electric motor.

The beneficial effects are as follows. The grass-discharge-passage stirring and cutting mechanism for rear shaft at bottom of lawn mower, using special materials and ultra-thin blades for carbon, nitrogen and boron treatment and organic post-processing, and noise-elimination inner shafts. It takes more collection of cutting grass, reduces repetitive cutting, improves cutting and rowing, improves grass path, reduces friction and heat, improves treatment process, extends working life, improves product quality.

The blade no longer breaks, lowering noise in the rear row, which can be used for motor and engine lawn mowers, and opens a new market for lawn mowers with bottom rear axles that use the dial-cutting and cutting grass passage mechanism. It has overload protection function, configured with pressure protection sensor. When overloaded, sensor will send a signal and makes the electromagnet's overload wafer attract, and slippery will take place between the blades and tool apron to automatically avoid the rotation. The improved grass-discharge-passage stirring and cutting mechanism for rear shaft at bottom of lawn mower is directly driven by the electric motor with a decelerator.

Figure 1:
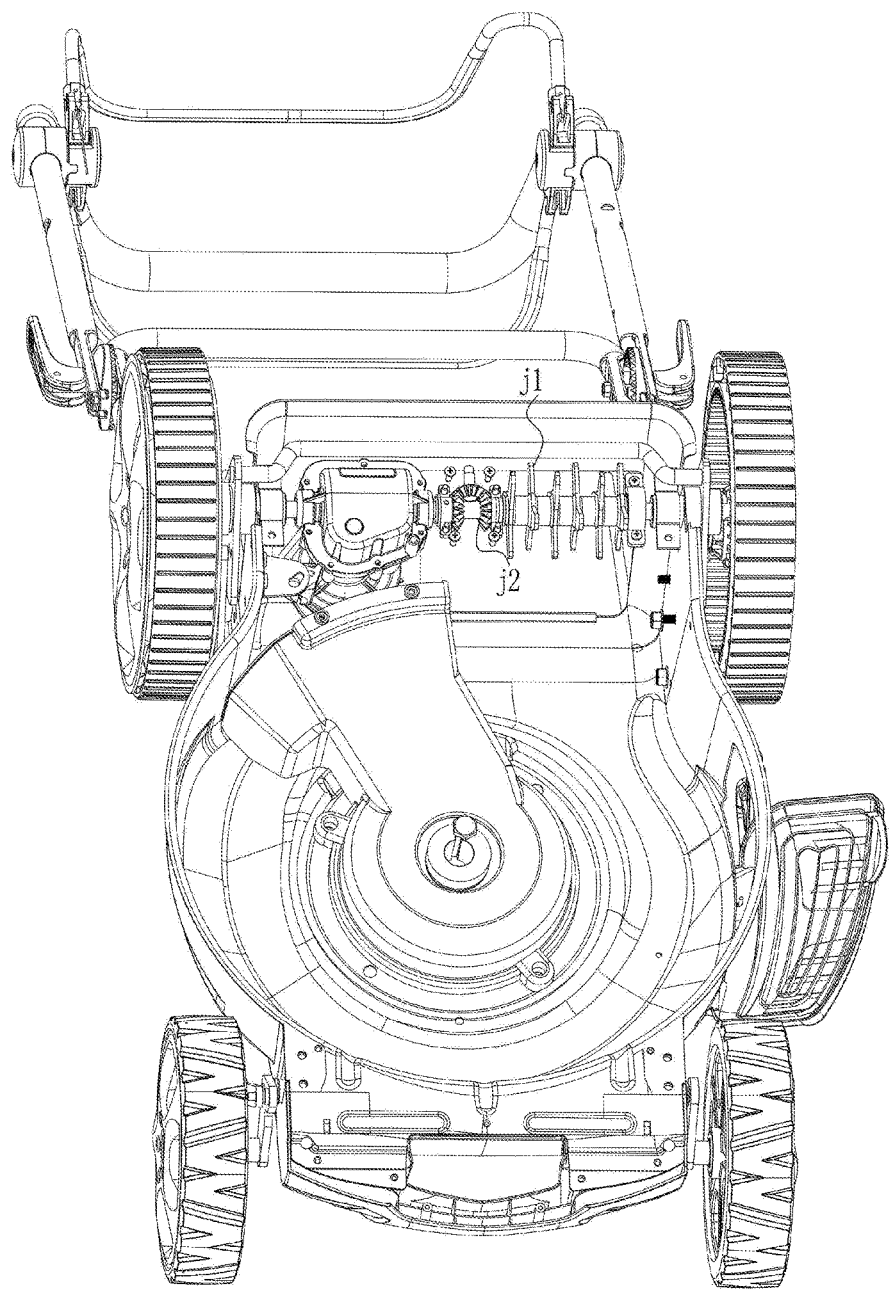
FIG. 1 is a schematic diagram of a bottom of an improved grass-discharging-passage stirring and cutting mechanism for a rear shaft at a bottom of a lawn mower.
Figure 2:
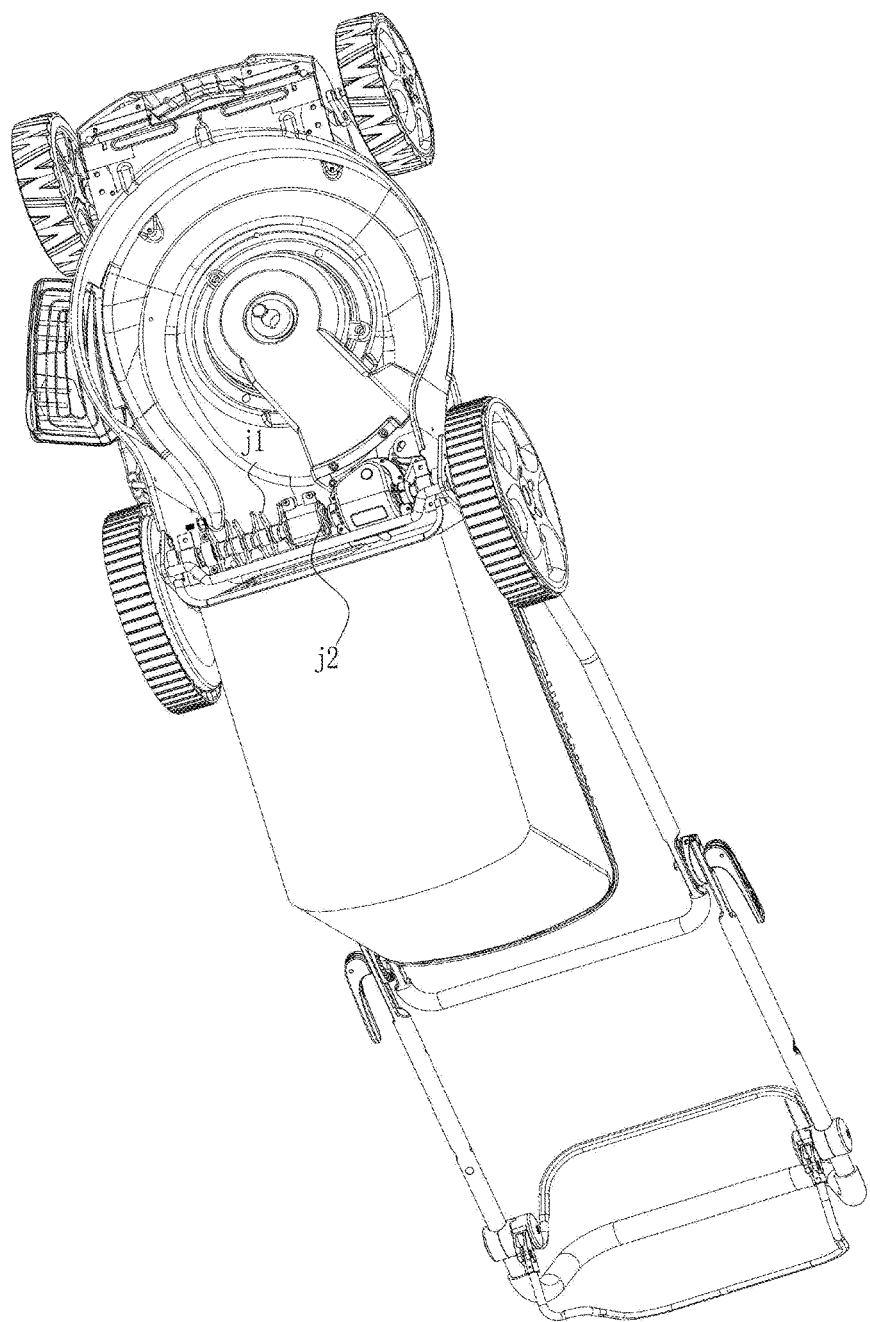
FIG. 2 is a schematic bottom view of the grass-discharging-passage stirring and cutting mechanism for the rear shaft at the bottom of the lawn mower.
Figure 3:
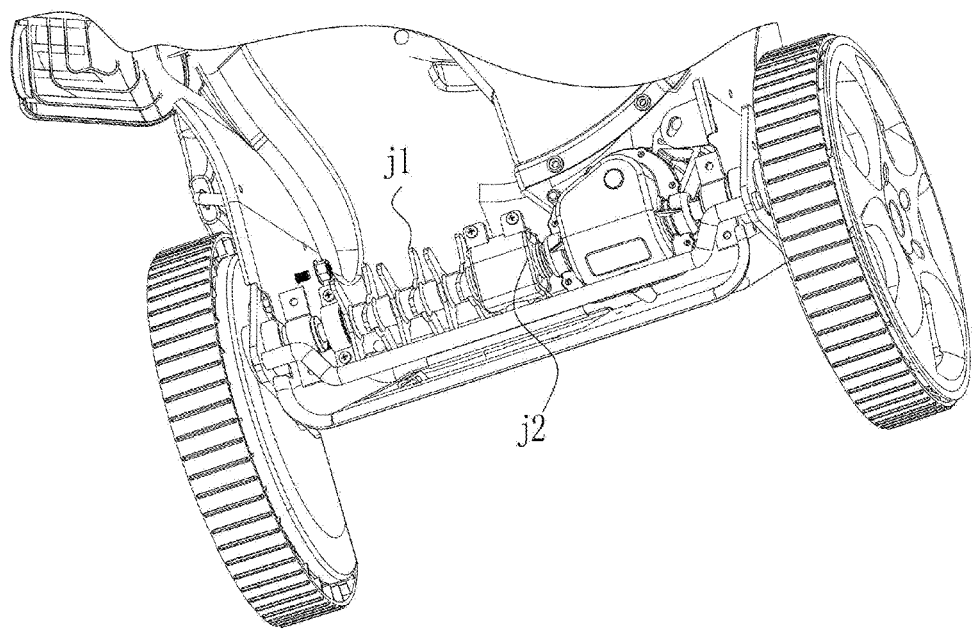
FIG. 3 is a schematic diagram of the grass-discharging-passage stirring and cutting mechanism for the rear shaft at the bottom.
Figure 4:
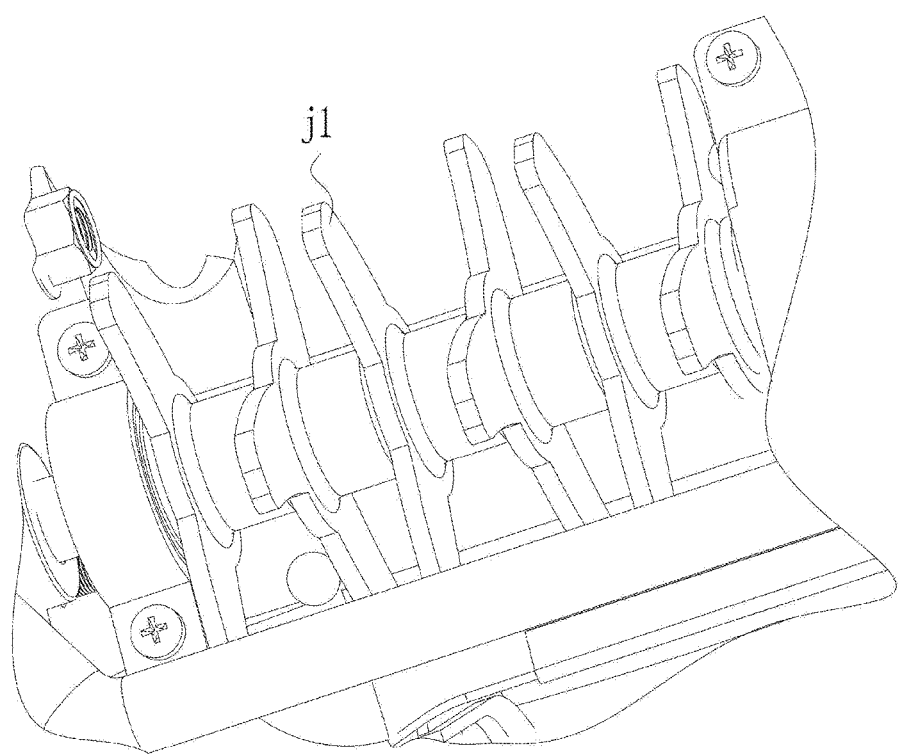
FIG. 4 is a schematic enlarged view of the grass-discharging-passage stirring and cutting mechanism for the rear shaft at the bottom.
Figure 5:
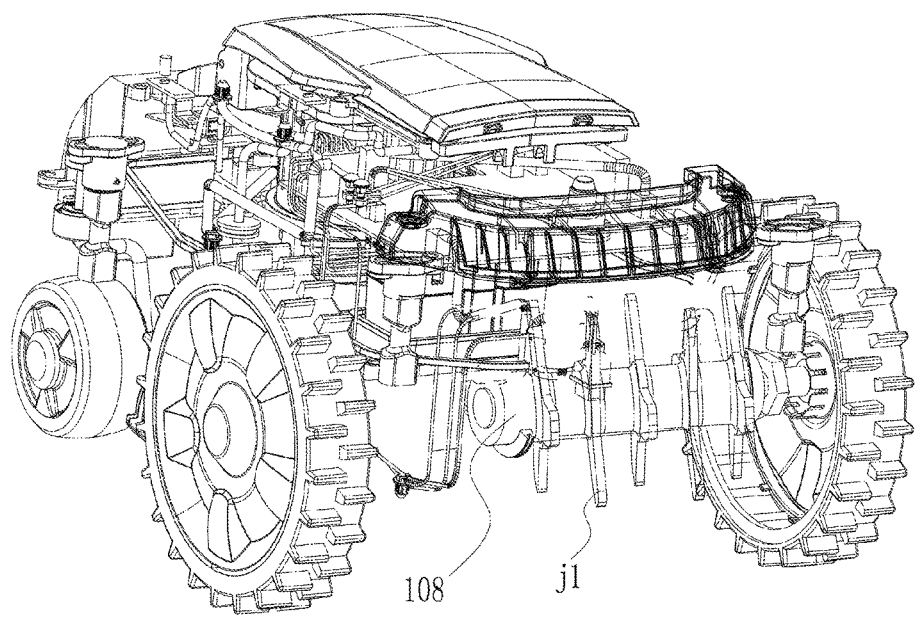
FIG. 5 is a schematic diagram of driving a smart lawn mower by a retarder (108) connected to an electric motor.
Figure 6:
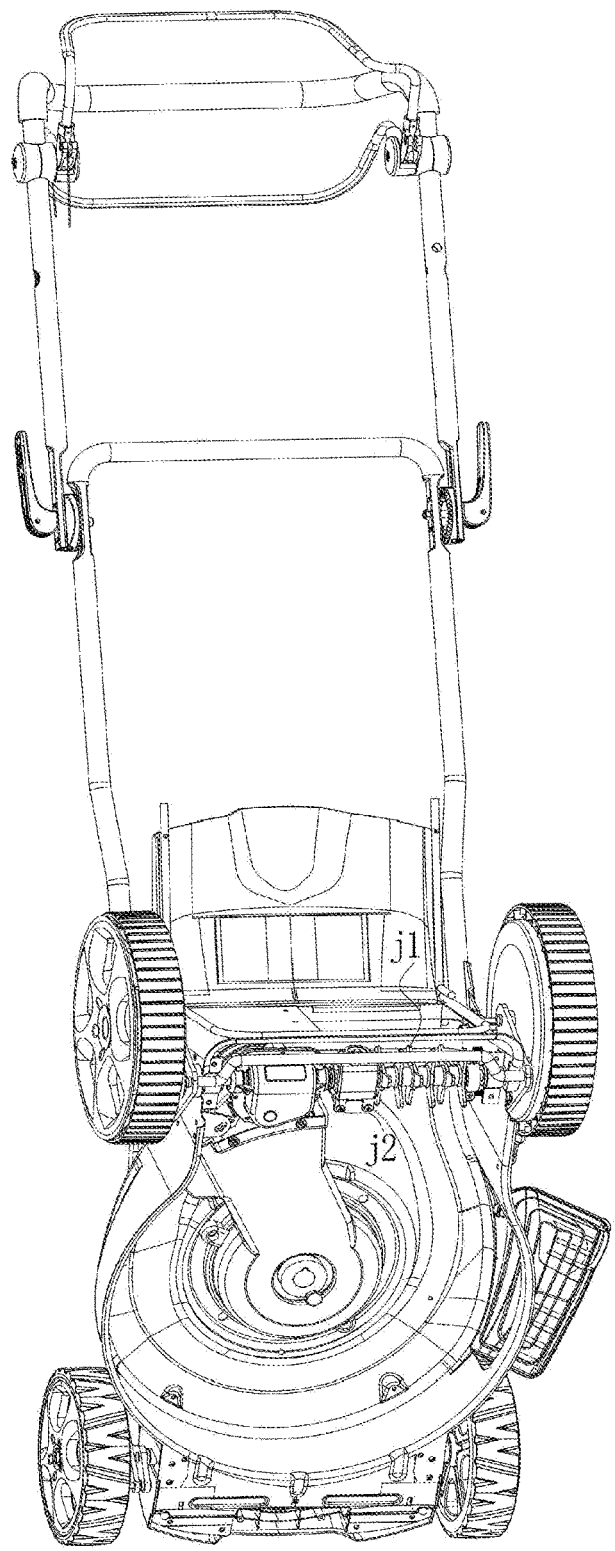
FIG. 6 is another schematic bottom view of the grass-discharging-passage stirring and cutting mechanism for the rear shaft at the bottom of the lawn mower.
Figure 7:
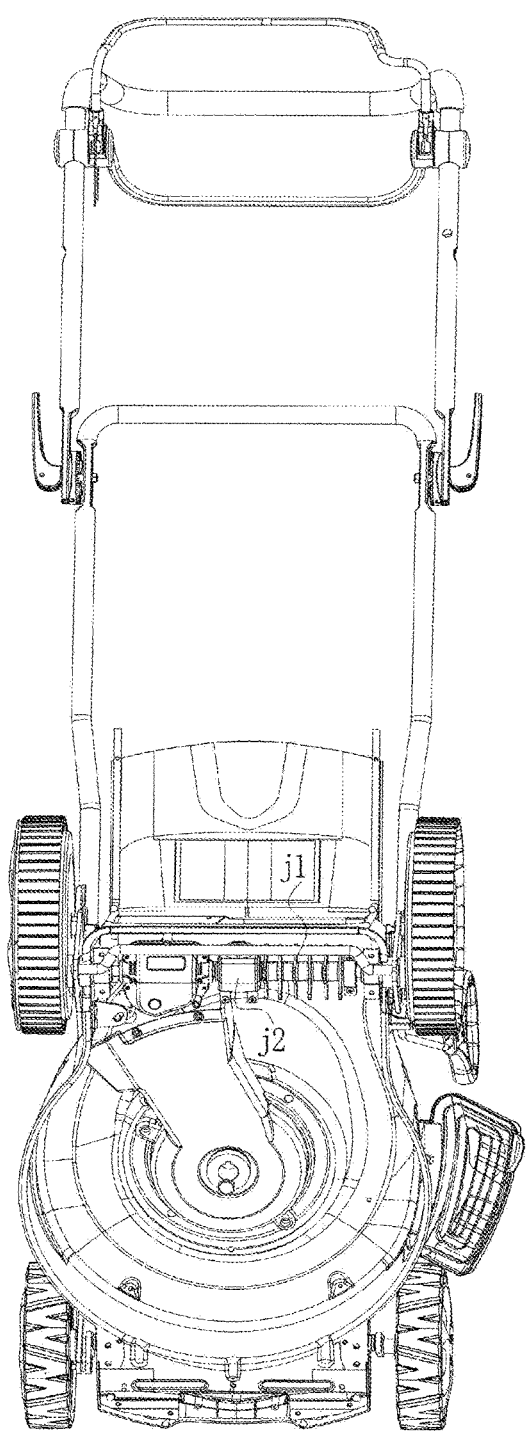
FIG. 7 is another schematic front bottom view of the grass-discharging-passage stirring and cutting mechanism for the rear shaft at the bottom of the lawn mower.
Figure 8:
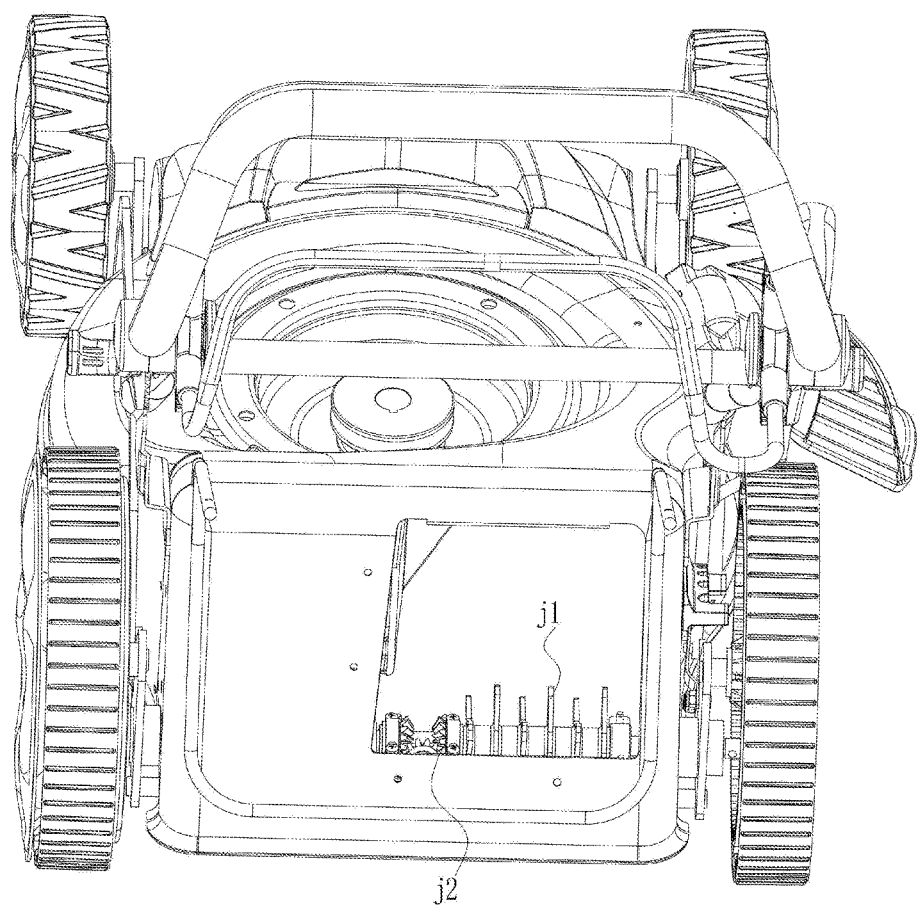
FIG. 8 is a schematic diagram of the rear portion of an improved grass-discharging-passage stirring and cutting mechanism for the rear shaft at the bottom of the lawn mower.
Figure 9:
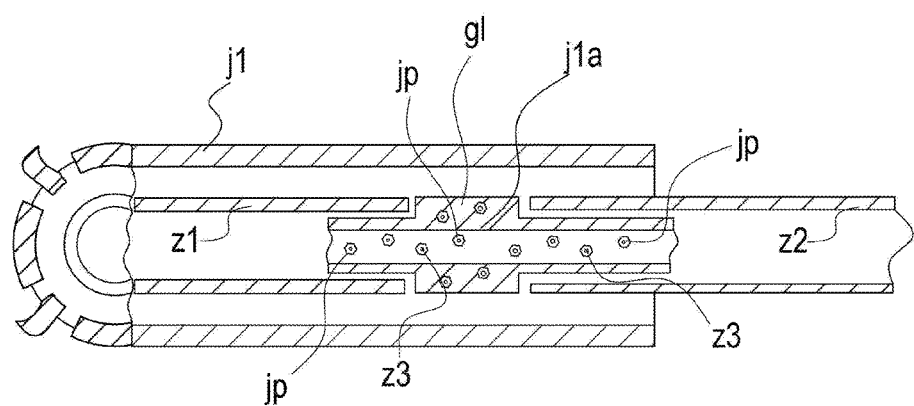
FIG. 9 is a schematic diagram of a noise-elimination inner shaft (j1a)
Figure 10:
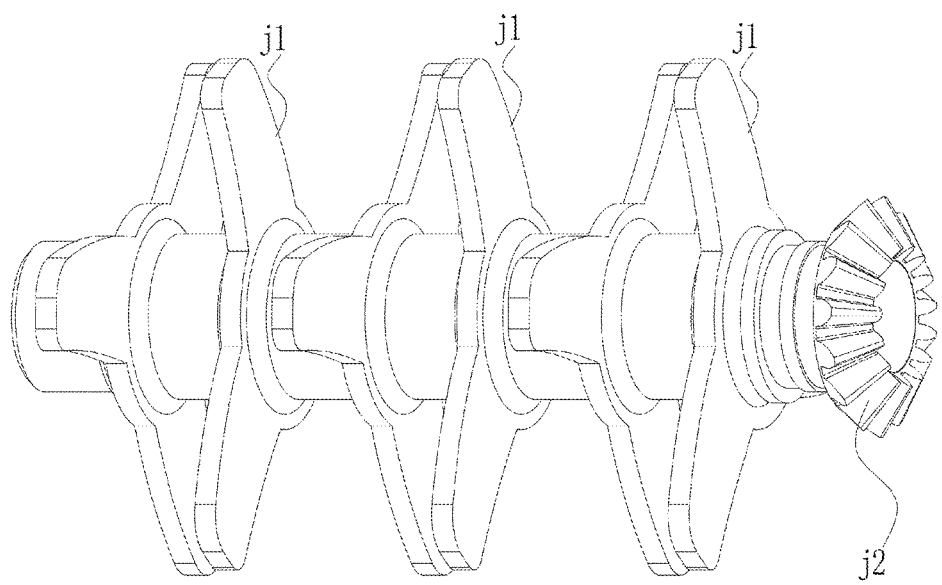
FIG. 10 is a schematic left side view of a gear (j2) of a retarder and a stirring and cutting rod (j1)
Figure 11:
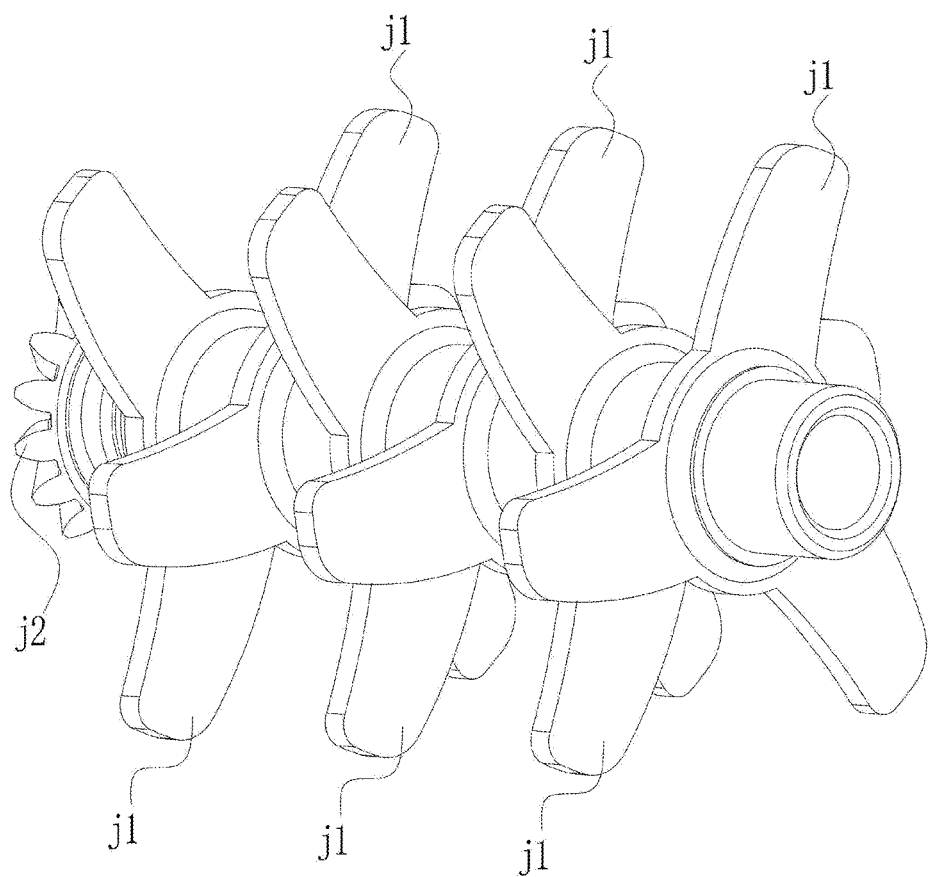
FIG. 11 is a schematic right side view of a gear (j2) of the retarder and a stirring and cutting rod (j1).

In the figures: j1. stirring and cutting rod; j1a. noise-elimination inner shaft; jp. noise-elimination wedges; z1. left shaft; z2. right shaft; z3. noise-elimination hole; j2. gear of retarder; g1: isolated connection portion and 108. retarder connected to an electric motor.

DETAILED DESCRIPTION

In order to describe the present invention more clearly, the present invention will be further described below with reference to the drawings and embodiments.

The grass-discharging-passage stirring and cutting mechanism for the rear shaft at the bottom of a lawn mower is a dual-purpose grass-discharging-passage stirring and cutting mechanism for the bottom of a lawn mower after noise elimination and metal post-treatment. The lawn mower includes a gear (j2) of a retarder ganged with lawn mower and a stirring and cutting rod (j1) arranged on the noise-elimination inner shaft (j1a) of the rear shaft of the lawn mower, characterized in that the noise-elimination inner shaft (j1a) is hollow and has a plurality of noise-elimination wedges (jp); the rear shaft of the lawn mower has a shape of a hollow tube and the inner side thereof is hollow to enable external air to pass through for cooling. The rear shaft of the lawn mower is divided into a left shaft and a right shaft, and the noise-elimination inner shaft (j1a) is arranged between the left shaft and the right shaft of the rear shaft of the lawn mower. The noise-elimination inner shaft (j1a) is divided into three sections. The middle section of the noise-elimination inner shaft (j1a) has a same diameter as a diameter of the rear shaft of the lawn mower, and the left section and the right section of the noise-elimination inner shaft (j1a) are hollow tubes which have internal diameters respectively smaller than those of the left shaft and the right shaft of the rear shaft of the lawn mower. The left section of the noise-elimination inner shaft (j1a) is inserted into the left shaft of the rear shaft of the lawn mower, and the right section of the noise-elimination inner shaft (j1a) is inserted into the right shaft of the rear shaft of the lawn mower. A plurality of hexagonal-pyramid-shaped noise-elimination wedges (jp) are arranged on the noise-elimination inner shaft (j1a). The hexagonal pyramid shape has a small hole in the top thereof to act as a noise-elimination hole (z3). The plurality of hexagonal-pyramid-shaped noise-elimination wedges (jp) arranged on the hollow tube of the inner shaft located at an end of the noise-elimination inner shaft near the position matched with the rear shaft of the lawn mower are dense, while the plurality of hexagonal-pyramid-shaped noise-elimination wedges (jp) arranged on the hollow tube of the inner shaft located at an end of the noise-elimination inner shaft away from the position matched with the rear shaft of the lawn mower are sparse. The outer middle portion of the noise-elimination inner shaft is provided with an isolated connection portion (g1) which acts as a portion matched with the rear shaft of the lawn mower, such that one end of the portion is connected to one end of the rear shaft at the right side of the rear shaft near the grass outlet and the other end of the portion is connected to one end of the rear shaft away from the grass outlet, and thus the gas flow from the stirring and cutting site near the grass outlet with reference to a Lighthill parameter and a turbulence noise of Richards noise is compressed at a port of an end near the right rear wheel and near the grass outlet, and then re-expanded into the hollow rear shaft. The re-expanded gas flow is compressed again by the plurality of dense hexagonal-pyramid-shaped noise-elimination wedges (jp) arranged on the hollow tube of the noise-elimination inner shaft at the end of the noise-elimination inner shaft (j1a) near the grass outlet in the hollow rear shaft. After running in the noise-elimination inner shaft (j1a) for a while, the gas flow is compressed again by the plurality of sparse hexagonal-pyramid-shaped noise-elimination wedges (jp) arranged on the hollow tube of the noise-elimination inner shaft (j1a) at the end of the noise-elimination inner shaft (j1a) away from the grass outlet, and then overflows again into an inner through hole at the other end of the noise-elimination inner shaft (j1a) included in the rear shaft to flow to the outside, such that the noise elimination and reduction process is conducted by compressing, expanding, compressing again and expanding again; and this also facilitates cooling via the external air. A plurality of stirring and cutting rods (j1) are sleeved on the rear shaft. The stirring and cutting rods (j1) are blades. Each of the stirring and cutting rods (j1) has three blades with diameters of the three blades angled at 120 degrees with each other. The blades are sleeved on the rear shaft, but each of the three blades of adjacent axially of the rear shaft should intersect with each other at an angle of 30 degrees. The slip cutting angle of the blades is 20 degrees, and the protruding direction of each of the blades along the radial direction and the hypsokinesis of the radial line make the included angle of the blade be 13.5 degrees. The gear (j2) of the retarder, the noise-elimination inner shaft (j1a) and the stirring and cutting rod (j1) are metallic workpieces which are subjected to post-treatment via high-frequency current by using a skin effect. When the blade makes a collision with obstacles such as stones, it is easy to damage the engine. The metallic workpieces are buried in rare earth and is subjected to post-treatment via high-frequency current by using the skin effect. The workpieces may be made of titanium aluminum and rhenium, and are placed in molded ceramic containing yttrium oxide, rare earth, indium and clay, and are subjected to isotope radiation and laser scan. The blade is subjected to three-dimensional printed by using carbon fibers, then sharpened using diamond, is subjected to thermal treatment in mixed buried soil consisting of nanoscale printing toner, urea and borax, is scanned by variable-frequency electromagnetic field and laser, and is subjected to platinum-rhodium catalysis, so that the spatial crystal lattices of the blade are dispersed; then the blade is placed into mixed buried soil consisting of nanoscale printing toner, urea and borax and subjected to co-penetration heat treatment by using boron carbon nitride and a variable-frequency electromagnetic field, is heated at a co-penetration turning point of 723° C., then quenched in horse urine, washed with clear water and then coated with varnish. The blade not only can meet the needs of practical stirring and cutting of grass, but also has an overload protection function. Therefore, the mechanism is provided with a pressure-protection sensor. When overload occurs, the sensor sends a signal and enables an overload contact of an electromagnet to exert an attraction force so that slip occurs between the blade holder and blade so as to realize automatic avoidance of rotation. The grass-discharging-passage stirring and cutting mechanism for the rear shaft at the bottom of the lawn mower can be powered directly by a retarder (108) connected to an electric motor. During the process of heating at the co-penetration turning point of 723° C., quenching in horse urine, and then washing with clear water, it is found occasionally that one of the blades has a cool white color, is hard outside and soft inside, and is better in use than other blades. Finally it is found that although the atomic internal mechanism of using organic natural substances to conduct the post-treatment needs to be researched by human continuously, the action of this mechanism exists objectively.

A rear-driven three-stage four-planetary-gear walking gearbox for a smart garden lawn mower is characterized in that the gearbox is a three-stages four-planetary-gears meshing rear-wheel driven gear reduction gearbox (108) used for a lawn mower, which adopts: a brushless motor having a rotation speed of 20000 rpm, a power of 150 watts, a voltage of 36 volts and an output shaft diameter of 5 mm; and a velocity control circuit. The driving gear of the motor has a tooth number of 20. The motor gear of the driving gear of the motor having the tooth number of 20 has a meshing transmission relationship with the four-planetary-gears on the first-stage planetary carrier of the three-stage planetary system. Each of the gears is a helical gear and has a spiral lead angle of 12.7 degrees. The four planetary gears respectively have a tooth number of 19 and a modulus of 0.6 and both spin and revolve around a common axis of the motor axis, and are respectively installed on four planetary gear shafts of the planetary carrier distributed evenly and equidistant from the common axis. The motor gear having the tooth number of 20 is made of steel 40Cr; the four planetary gears are all made of polyformaldehyde SP500; the internal gear of the central wheel of the planetary system which is engaged with the planetary gear and has a fixed a geometrical axis is made of steel 40Cr, and has a modulus of 0.6 and a tooth number of 60. The transmission type of the planetary gear is the NGW type, wherein N represents an internal meshing gear, G represents a common gear between two meshed gear pairs, and W represents an external meshing gear. The transmission ratio of the planetary gear transmission is 1+60/20, i.e., 4, which meets the recommended transmission ratio value of 2.7 to 9, and the transmission efficiency is 97-99%. The central output gear on the first-stage planetary carrier has a meshing transmission relationship with the four-planetary-gears on the second-stage planetary carrier, and each of the gears is a helical gear and has a spiral lead angle of 12.7 degrees. The four planetary gears respectively have a tooth number of 19 and a modulus of 0.6, both spin and make a revolution around a common axis of the motor axis, and are respectively installed on four planetary gear shafts of the planetary carrier distributed evenly and equidistant from the common axis. The central output gear on the first-stage planetary carrier is made of steel 40Cr, and the four planetary gears on the second-stage planetary carrier are all made of polyformaldehyde SP500; the internal gear of the central wheel of the planetary system which is engaged with the planetary gear and has a fixed a geometrical axis is made of steel 40Cr, and has a modulus of 0.6 and a tooth number of 60. The transmission type of the planetary gear is also the NGW type, wherein N represents an internal meshing gear, G represents a common gear between two meshed gear pairs, and W represents an external meshing gear. The transmission ratio of the second-stage planetary gear transmission is 1+60/19, i.e., 3.16.

Firstly, a computer 3D model is built, and then die sinking is conducted; and thereafter an anti-collision device and a brake are installed to the lawn mower. The technical equation and the modeling method are as follows: adopting PRO/ENGINEER WILDFIRE drawing software to create a new working directory, create a part, and sketch 2 concentric circles. The Var Sect Sweep command is directed and the above 2 circles are selected as a scanning trajectory and a reference trajectory. A straight line parallel to the plane of the two circles is drawn, which has a length of $L=(D-d)/2$, and along a projection line, parameter 1 is established correspondingly to the circle edges: C. The parameter is a real number and can be assigned a value between 0.01-1 depending on specific working conditions, for example 0.3; and C is also referred to as wave height. Parameter 2 is established: N is an integer and can be assigned a value between 2 to 100 depending on specific working conditions, for example 13; and N is also referred to as wave number. A relation is established. For example, a sine wave equation is defaulted in computer $SD_i=C*SIN(TRAJPAR*360*N)$. In the aforementioned equation, i is size digital serial number; SIN=SINE and is a sine function; and TRAJPAR is a locus function. By adopting rotating, combining, materializing and the other commands, a functional handicaps is molded.

Then the equation is inputted into a CNC processing center to produce a steel die using CIMATRO or MASTCAM, or to process using a milling machine, a facing machine and electric sparks. When the process is conducted using electric sparks, the equation is inputted into the CNC processing center, and a tungsten copper electrode should be made first.

There are many manufacturing methods, including: a manufacturing method for die casting the aluminum alloy, in which functional handicaps gears are produced in batches using a die-casting machine equipped with a cold pressing chamber, and an anti-friction material is added into the gears.

The central output gear on the second-stage planetary carrier has a meshing transmission relationship with the three-planetary-gears on the third-stage planetary carrier. Each of the gears is a helical gear and has a spiral lead angle of 12.7 degrees. The three planetary gears of the third stage respectively have a tooth number of 18 and a modulus of 0.6, both spin and revolve around a common axis of the motor axis, and are respectively installed on three planetary gear shafts of the planetary carrier distributed evenly and equidistant from the common axis. The central output gear on the second-stage planetary carrier is made of steel 40Cr, and has a tooth number of 18 and a modulus of 0.6, and the three planetary gears on the third-stage planetary carrier are all made of steel 40Cr instead of the polyformaldehyde SP500; the internal gear of the central wheel of the planetary system which is engaged with the planetary gear and has a fixed a geometrical axis is made of steel 40Cr, and has a modulus of 0.6 and a tooth number of 60. The transmission type of the planetary gear is also the NGW type, wherein N represents an internal meshing gear, G represents a common gear between two meshed gear pairs, and W represents an external meshing gear. The transmission ratio of the third-stage planetary gear transmission is 1+60/18, i.e., 4.33. The total transmission ratio of the three stages is 4×3.16×4.33=55 times, the rotation speed is 20000 rpm/55=360, and a speed control circuit is equipped for use together. In order to distribute the torsional moment of each stage more reasonably, a plastic gear is used at a location upon which a small force is exerted, and a steel gear is used at a location upon which a large force is exerted, and especially a helical gear of which the meshing property is of self-evidence used. The gear is placed into the mixed buried soil consisting of nanoscale printing toner, urea and borax, is subjected to thermal treatment, is scanned y variable-frequency electromagnetic field and laser, and is catalyzed by platinum-rhodium such that the spatial crystal lattices thereof are dispersed; then the gear is placed into the mixed buried soil and subjected to co-penetration heat treatment by using boron carbon nitride and a variable-frequency electromagnetic field; and the gear is heated at a co-penetration turning point of 723° C., then quenched in the horse urine, and washed with clear water.

Since the grass-discharging passage is very narrow and small while many stirring and cutting rods and blades are used, in order to increase the efficiency, the ultra-thin blade is adopted. The gear (j2) of the retarder, the noise-elimination inner shaft (j1a) and the stirring and cutting rod (j1) are metallic workpieces which are treated via high-frequency current by using a skin effect. When the blade makes a collision with obstacles such as stones, breakage of the blade and damage to the gear and engine power may be easily caused. The ultra-thin blade and the noise-elimination inner shaft which are made of special material and subjected to carbonitroboronizing and organic post-treatment are adopted. The metallic workpieces are buried in rare earth and treated via high-frequency current by using the skin effect. The workpieces may be made of titanium aluminum and rhenium, are placed in molded ceramic containing yttrium oxide, rare earth, indium and clay, and are subjected to isotope radiation and laser scan. The blade may be subjected to three-dimensional printing by using carbon fibers, then sharpened using diamond, placed into mixed buried soil consisting of nanoscale printing toner, urea and borax, is subjected to thermal treatment, is scanned by variable-frequency electromagnetic field and laser, and is subjected to electromagnetic co-penetration heat treatment under the platinum-rhodium catalysis, such that the spatial crystal lattices of the blade are dispersed; then the blade is subjected to organic post-treatment, is heated at a co-penetration turning point of 723° C., and then quenched in the horse urine, washed with clear water and then coated with varnish. Such a blade not only can meet the needs of practical stirring and cutting of grass, but also has an overload protection function. Therefore, the mechanism is provided with the pressure-protection sensor. When overload occurs, the sensor sends a signal and enables an overload contact of an electromagnet to exert an attraction force, such that slip occurs between the blade holder and blade so as to realize automatic avoidance of rotation. The improved grass-discharging-passage stirring and cutting mechanism for the rear shaft at the bottom of the lawn mower may be powered directly by a gear reduction gearbox (108) connected to an electric motor.

Advantages: a grass-discharging-passage stirring and cutting mechanism for a rear shaft at a bottom of a lawn mower is disclosed. Ultra-thin blades are adopted since a grass-discharging passage is very narrow and small while many stirring and cutting rods and blades are used. The blade is firstly placed into mixed buried soil consisting of nanoscale printing toner, urea and borax, is subjected to thermal treatment, is scanned by variable-frequency electromagnetic field and laser, and is subjected to electromagnetic co-penetration heat treatment under platinum-rhodium catalysis; then the blade is subjected to organic post-treatment, is heated at a co-penetration turning point of 723° C., and then quenched in an organic matter of horse urine; a noise-elimination inner shaft (j1a) of the rear shaft of the lawn mower is hollow and has a plurality of noise-elimination wedges (jp) for facilitating noise elimination and reduction. The grass-discharging-passage stirring and cutting mechanism for the rear shaft at the bottom of the lawn mower can be powered directly by a three-stage planetary retarder (108) connected to an electric motor.

The foregoing disclosures are merely some specific embodiments of the present invention, but the present invention is not limited to this. Any changes that can be contemplated by those skilled in the art shall fall into the protection scope of the present invention.

What is claimed is:

1. An improved grass-discharging-passage stirring and cutting mechanism for a rear shaft at a bottom of a lawn mower, which is a dual-purpose grass-discharging-passage stirring and cutting mechanism at the bottom of a lawn mower after noise elimination and metal post-treatment, wherein
the lawn mower comprises a gear (j2) of a retarder and a stirring and cutting rod (j1) arranged on a noise-elimination inner shaft (j1a) of the rear shaft of the lawn mower, wherein the noise-elimination inner shaft (j1a) is hollow and has a plurality of noise-elimination wedges (jp);
the rear shaft of the lawn mower has a shape of a hollow tube and the inner side thereof is hollow to enable external air to pass through for cooling;
the rear shaft of the lawn mower is divided into a left shaft (z1) and a right shaft (z2), and the noise-elimination inner shaft (j1a) is arranged between the left shaft (z1) and the right shaft (z2) of the rear shaft of the lawn mower;
the noise-elimination inner shaft (j1a) is divided into three sections comprising a middle section, a left section, and a right section;
the middle section of the noise-elimination inner shaft (j1a) has a same diameter as a diameter of the rear shaft of the lawn mower, and the left section and the right section of the noise-elimination inner shaft (j1a) are hollow tubes which have internal diameters respectively smaller than those of the left shaft (z1) and the right shaft (z2) of the rear shaft of the lawn mower;
the left section of the noise-elimination inner shaft (j1a) is inserted into the left shaft (z1) of the rear shaft of the lawn mower, and the right section of the noise-elimination inner shaft (j1a) is inserted into the right shaft (z2) of the rear shaft of the lawn mower;
a plurality of hexagonal-pyramid-shaped noise-elimination wedges (jp) are arranged on the noise-elimination inner shaft (j1a);
the hexagonal pyramid shape has a small hole in the top thereof to act as a noise-elimination hole (Z3);
the plurality of noise-elimination wedges (jp) arranged on the hollow tube of the inner shaft (j1a) are located at an end of the noise-elimination inner shaft near the position matched with the rear shaft of the lawn mower, and the plurality of noise-elimination wedges (jp) arranged on the hollow tube of the inner shaft are located at an end of the noise-elimination inner shaft (j1a) away from the position matched with the rear shaft of the lawn mower;
the outer middle portion of the noise-elimination inner shaft (j1a) is provided with an isolated connection portion (g1) which acts as a portion matched with the rear shaft of the lawn mower, such that one end of the portion is connected to one end of the rear shaft at the right side of the rear shaft near the grass outlet and the other end of the portion is connected to one end of the rear shaft away from the grass outlet, and thus the gas flow from the stirring and cutting site near the grass outlet with reference to a Lighthill parameter and a turbulence noise of Richards noise is compressed at a port of an end near the right rear wheel and near the grass outlet, and then re-expanded into the hollow rear shaft;
the re-expanded gas flow is compressed again by the plurality of dense hexagonal-pyramid-shaped noise-elimination wedges (jp) arranged on the hollow tube of the noise-elimination inner shaft (j1a) at the end of the noise-elimination inner shaft (j1a) near the grass outlet in the hollow rear shaft;
after running in the noise-elimination inner shaft for a while, the gas flow is compressed again by the plurality of sparse hexagonal-pyramid-shaped noise-elimination wedges (jp) arranged on the hollow tube of the noise-elimination inner shaft (j1a) at the end of the noise-elimination inner shaft (j1a) away from the grass outlet, and then overflows again into an inner through hole at the other end of the noise-elimination inner shaft (j1a) included in the rear shaft to flow to the outside, such that the noise elimination and reduction process is conducted by compressing, expanding, compressing again and expanding again; and this also facilitates cooling via the external air;

a plurality of stirring and cutting rods (j1) are sleeved on the rear shaft;

the stirring and cutting rods are blades;

each of the stirring and cutting rods (j1) has three blades with diameters of the three blades angled at 120 degrees with each other; the blades are sleeved on the rear shaft, but each of the three blades of adjacent axially of the rear shaft should intersect with each other at an angle of 30 degrees.

2. The improved grass-discharging-passage stirring and cutting mechanism for a rear shaft at a bottom of a lawn mower according to claim 1, wherein the slip cutting angle of the blades is 20 degrees, and the protruding direction of each of the blades along the radial direction and the hypsokinesis of the radial line make the included angle of the blade be 13.5 degrees.

3. The improved grass-discharging-passage stirring and cutting mechanism for a rear shaft at a bottom of a lawn mower according to claim 1, wherein the gear (j2) of the retarder, the noise-elimination inner shaft (j1*a*) and the stirring and cutting rod (j1) are metallic work pieces.

* * * * *